(12) United States Patent
Nie

(10) Patent No.: US 11,187,947 B2
(45) Date of Patent: Nov. 30, 2021

(54) LIQUID CRYSTAL DISPLAY DEVICE

(71) Applicant: WUHAN CHINA STAR OPTOELECTRONICS TECHNOLOGY CO., LTD., Hubei (CN)

(72) Inventor: Xiaohui Nie, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 420 days.

(21) Appl. No.: 16/335,256

(22) PCT Filed: Dec. 28, 2018

(86) PCT No.: PCT/CN2018/124791
§ 371 (c)(1),
(2) Date: Mar. 21, 2019

(87) PCT Pub. No.: WO2020/103292
PCT Pub. Date: May 28, 2020

(65) Prior Publication Data
US 2021/0325707 A1    Oct. 21, 2021

(30) Foreign Application Priority Data
Nov. 22, 2018 (CN) .......................... 201811401964.1

(51) Int. Cl.
*G02F 1/1345* (2006.01)
*G02F 1/1368* (2006.01)
*G02F 1/13* (2006.01)
*G02F 1/1362* (2006.01)

(52) U.S. Cl.
CPC ........ *G02F 1/13452* (2013.01); *G02F 1/1309* (2013.01); *G02F 1/1368* (2013.01);
(Continued)

(58) Field of Classification Search
CPC ............... G02F 1/13452; G02F 1/1309; G02F 1/136254; G02F 1/136286; G02F 1/1368; G02F 1/136222; G02F 1/136209
See application file for complete search history.

(56) References Cited

U.S. PATENT DOCUMENTS 6,985,128 B1    1/2006    Kida et al.
8,969,199 B1    3/2015    Yuan et al.
(Continued)

FOREIGN PATENT DOCUMENTS

CN    1399339 A    2/2003
CN    1210608 C    7/2005
(Continued)

*Primary Examiner* — Dung T Nguyen
(74) *Attorney, Agent, or Firm* — Soroker Agmon Nordman

(57) ABSTRACT

A liquid crystal display device includes a thin film transistor (TFT) array substrate, an anisotropic conductive adhesive film, a chip, a flexible printed circuit, a color filter substrate, a polarizer, and a protective layer. The TFT array substrate includes an output terminal region, an input terminal region, first test signal wires, and second test signal wires. The second test signal wires are connected to the first test signal wires in an out-of-array wiring region. Material of the first test signal wires is titanium aluminum alloy, and material of the second test signal wires is polycrystalline silicon.

17 Claims, 4 Drawing Sheets

(52) U.S. Cl.
CPC .. *G02F 1/136254* (2021.01); *G02F 1/136209* (2013.01); *G02F 1/136222* (2021.01); *G02F 1/136286* (2013.01)

(56) References Cited

U.S. PATENT DOCUMENTS

| | | |
|---|---|---|
| 2003/0117536 A1 | 6/2003 | Jeon |
| 2003/0184705 A1 | 10/2003 | Murade et al. |
| 2008/0278667 A1 | 11/2008 | Kobashi |
| 2011/0050660 A1 | 3/2011 | Kim et al. |
| 2014/0264338 A1 | 9/2014 | Kim et al. |
| 2015/0327071 A1 | 11/2015 | Sharma et al. |
| 2018/0269269 A1 | 9/2018 | Kim et al. |
| 2019/0163304 A1* | 5/2019 | Shim ................... H01L 27/323 |
| 2020/0074955 A1* | 3/2020 | Fujikawa ............ G02F 1/13454 |

FOREIGN PATENT DOCUMENTS

| | | |
|---|---|---|
| CN | 101025495 A | 8/2007 |
| CN | 102005166 A | 4/2011 |
| CN | 102169094 A | 8/2011 |
| CN | 103296056 A | 9/2013 |
| CN | 104051409 A | 9/2014 |
| CN | 104465674 A | 3/2015 |
| CN | 104916242 A | 9/2015 |
| CN | 204807669 U | 11/2015 |
| CN | 106054474 A | 10/2016 |
| CN | 107065363 A | 8/2017 |
| CN | 107065364 A | 8/2017 |
| CN | 108227268 A | 6/2018 |
| CN | 108573997 A | 9/2018 |
| CN | 101303497 A | 11/2018 |
| TW | 556013 B | 10/2003 |

* cited by examiner

LIQUID CRYSTAL DISPLAY DEVICE

FIELD OF INVENTION

The present invention relates to fields of display technologies, especially to a liquid crystal display device.

BACKGROUND OF INVENTION

Chip-on-glass (COG) substrate technology is key technology for achieving small-sized, lighter, thinner display panels, and refers to technology of directly bonding a driver chip to a liquid crystal display (LCD) through an anisotropic conductive film (ACF). The driver chip is developed to be smaller and thinner, and therefore it is more demanding to the COG technology. A driver chip of a conventional COG is in die form and is crimped on a terminal region of a thin film transistor (TFT) array substrate through an ACF. The terminal region is disposed with chip input pins and chip output pins, and pins of the driver chip are crimped and connected to the pins of the terminal region one by one. To satisfy design high integration and narrow bezel small-sized requirements of the TFT array substrate, a test circuit design of the terminal region disposes test signal wires among chip output pins. In actual production, due to poor manufacturing process for the test signal wires and low precision of a bonding process for a module COG shorting occurs between pins on the glass and adjacent test signal wires during a chip bonding process with an ACF, which causes display errors.

As described above, the conventional LCD device, due to reasons of the poor manufacturing process for the test signal wires and low precision of the bonding process for the module COG has a shorting issue occurring between pins on the glass and adjacent test signal wires during a chip bonding process with an ACF, which causes display errors.

SUMMARY OF INVENTION

Technical Issue

The conventional liquid crystal display device, due to reasons of the poor manufacturing process for the test signal wires and low precision of the bonding process for the module COG, has a shorting issue occurring between pins on the glass and adjacent test signal wires during a chip bonding process with an ACF, which causes display errors.

Technical Solution

The present invention provides a liquid crystal display device that can improve reliability of a module COG process to solve the technical issue that the conventional liquid crystal display device, due to reasons of the poor manufacturing process for the test signal wires and low precision of the bonding process for the module COG, has a shorting issue occurring between pins on the glass and adjacent test signal wires during a chip bonding process with an ACF, which causes display errors.

To solve the above issue, the present invention provides technical solutions as follows.

The present invention provides a liquid crystal display device, comprising: a thin film transistor (TFT) array substrate, an anisotropic conductive adhesive film disposed on the TFT array substrate, and a chip, a flexible printed circuit, a color filter substrate, a polarizer and a protective layer bonded to the TFT array substrate through the anisotropic conductive adhesive film;

the TFT array substrate located in an out-of-array wiring region between a flexible printed circuit terminal region and a chip terminal region, the TFT array substrate further comprising a fan out region, a module test region, a multiplexing region, a dummy pixel region and an active area sequentially arranged and disposed on a side of the chip terminal region far away from the flexible printed circuit terminal region; the TFT array substrate comprising the flexible printed circuit terminal region and the chip terminal region, the chip terminal region disposed near a side of the flexible printed circuit terminal region far away from an edge of the TFT array substrate and located at an interval from the flexible printed circuit terminal region; the chip terminal region comprising an output terminal region and an input terminal region disposed between the output terminal region and the flexible printed circuit terminal region;

wherein a test circuit is disposed between the output terminal region and the input terminal region, the test circuit comprises first test signal wires and second test signal wires, an end of the first test signal wires is located in the input terminal region, an end of the second test signal wires is located in the output terminal region, another end of the second test signal wires and another end of the first test signal wires are connected to each other at a position near the output terminal region; material of the first test signal wires is titanium aluminum alloy, and material of the second test signal wires is polycrystalline silicon.

In the liquid crystal display device provided by an embodiment of the present invention, the active area comprises a light shielding layer, gate electrode signal transmission wires and data signal transmission wires; material of the light shielding layer is polycrystalline silicon, material of the gate electrode signal transmission wires is molybdenum, and material of the data signal transmission wires is titanium aluminum alloy.

In the liquid crystal display device provided by an embodiment of the present invention, the output terminal region comprises a buffer layer, a gate insulation layer, a gate electrode metal layer, an interlayer dielectric layer, a passivation layer and a pixel electrode that are sequentially stacked upon one another from bottom to top; the interlayer dielectric layer is defined with first through holes, and the buffer layer is defined with second through holes.

In the liquid crystal display device provided by an embodiment of the present invention, the second test signal wires extend through the first through holes respectively, extends through the second through holes respectively, and are connected to the first test signal wires respectively.

In the liquid crystal display device provided by an embodiment of the present invention, material of the buffer layer is silicon nitride or silicon dioxide, material of the gate insulation layer is silicon dioxide, material of the gate electrode metal layer is molybdenum, material of the interlayer dielectric layer is silicon nitride or silicon dioxide, and material of the passivation layer is silicon nitride.

In the liquid crystal display device provided by an embodiment of the present invention, the passivation layer is defined with third through holes, each of the third through holes is a trapezoidal structure with a narrow top and a wide bottom.

In the liquid crystal display device provided by an embodiment of the present invention, the first test signal wires are connected to the data signal transmission wires located in the output terminal region through the third through holes.

In the liquid crystal display device provided by an embodiment of the present invention, the chip comprises output pins corresponding to the output terminal region and input pins corresponding to the input terminal region; the output pins are bonded to the output terminal region through the anisotropic conductive adhesive film, and the input pins are bonded to the input terminal region through the anisotropic conductive adhesive film.

In the liquid crystal display device provided by an embodiment of the present invention, a plurality of output terminals are disposed in the output terminal region at intervals, a plurality of input terminals are disposed in the input terminal region at intervals; the output pins are bonded to the output terminals through the anisotropic conductive adhesive film respectively, the input pins are bonded to the input terminals through the anisotropic conductive adhesive film respectively.

The present invention also provides another liquid crystal display device, comprising: a thin film transistor (TFT) array substrate, an anisotropic conductive adhesive film disposed on the TFT array substrate, and a chip, a flexible printed circuit, a color filter substrate, a polarizer and a protective layer bonded to the TFT array substrate through the anisotropic conductive adhesive film;

the TFT array substrate comprising a flexible printed circuit terminal region and a chip terminal region, the chip terminal region disposed near a side of the flexible printed circuit terminal region far away from an edge of the TFT array substrate and located at an interval from the flexible printed circuit terminal region; the chip terminal region comprising an output terminal region and an input terminal region disposed between the output terminal region and the flexible printed circuit terminal region;

wherein a test circuit is disposed between the output terminal region and the input terminal region, the test circuit comprises first test signal wires and second test signal wires, an end of the first test signal wires is located in the input terminal region, an end of the second test signal wires is located in the output terminal region, another end of the second test signal wires and another end of the first test signal wires are connected to each other at a position near the output terminal region; material of the first test signal wires is titanium aluminum alloy, and material of the second test signal wires is polycrystalline silicon.

In the liquid crystal display device provided by an embodiment of the present invention, the output terminal region comprises a buffer layer, a gate insulation layer, a gate electrode metal layer, an interlayer dielectric layer, a passivation layer and a pixel electrode that are sequentially stacked upon one another from bottom to top; the interlayer dielectric layer is defined with first through holes, and the buffer layer is defined with second through holes.

In the liquid crystal display device provided by an embodiment of the present invention, the second test signal wires extend through the first through holes respectively, extends through the second through holes respectively, and are connected to the first test signal wires respectively.

In the liquid crystal display device provided by an embodiment of the present invention, material of the buffer layer is silicon nitride or silicon dioxide, material of the gate insulation layer is silicon dioxide, material of the gate electrode metal layer is molybdenum, material of the interlayer dielectric layer is silicon nitride or silicon dioxide, and material of the passivation layer is silicon nitride.

In the liquid crystal display device provided by an embodiment of the present invention, the passivation layer is defined with third through holes, each of the third through holes is a trapezoidal structure with a narrow top and a wide bottom.

In the liquid crystal display device provided by an embodiment of the present invention, the first test signal wires are connected to the data signal transmission wires located in the output terminal region through the third through holes.

In the liquid crystal display device provided by an embodiment of the present invention, the chip comprises output pins corresponding to the output terminal region and input pins corresponding to the input terminal region; the output pins are bonded to the output terminal region through the anisotropic conductive adhesive film, and the input pins are bonded to the input terminal region through the anisotropic conductive adhesive film.

In the liquid crystal display device provided by an embodiment of the present invention, a plurality of output terminals are disposed in the output terminal region at intervals, a plurality of input terminals are disposed in the input terminal region at intervals; the output pins are bonded to the output terminals through the anisotropic conductive adhesive film respectively, the input pins are bonded to the input terminals through the anisotropic conductive adhesive film respectively.

Advantages

Advantages of the present invention lies in that the liquid crystal display device provided by the present invention changes the test signal wires of titanium aluminum material of the test circuit extending toward the displaying region into test signal wires of polycrystalline silicon material before reaching the chip output region by replacement of wires, which avoids display errors due to poor precision of the COG and further enhances reliability of the module process.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
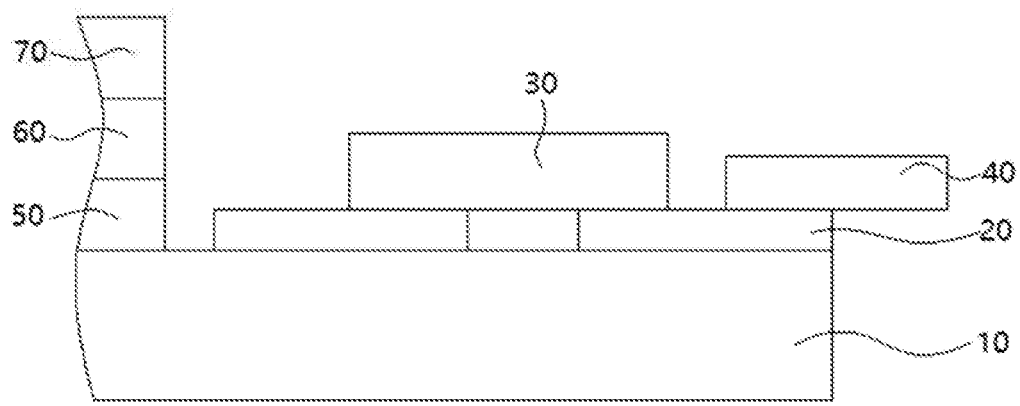
FIG. 1 is a schematic structural view of a liquid crystal display (LCD) device of the present invention.

Each of the following embodiments is described with appending figures to illustrate specific embodiments of the present invention that are applicable. The terminologies of direction mentioned in the present invention, such as "upper", "lower", "front", "rear", "left", "right", "inner", "outer" "side surface", etc., only refer to the directions of the appended figures. Therefore, the terminologies of direction are used for explanation and comprehension of the present invention, instead of limiting the present invention. In the figures, units with similar structures are marked with the same reference characters.

The present invention aims at the technical issue that the conventional liquid crystal display device, due to reasons of the poor manufacturing process for the test signal wires and low precision of the bonding process for the module COG, has a shorting issue occurring between pins on the glass and adjacent test signal wires during a chip bonding process with an ACF, which causes display errors. The present invention can solve the issue.

With reference to FIG. 1, FIG. 1 is a schematic structural view of a liquid crystal display (LCD) device of the present invention. The LCD device includes a thin film transistor (TFT) array substrate 10, an anisotropic conductive adhesive film 20 disposed on the TFT array substrate 10, a chip 30 bonded to through the TFT array substrate 10, the anisotropic conductive adhesive film 20, a flexible printed circuit 40, a color filter substrate 50, a polarizer 60, and a protective layer 70.

Specifically, the LCD device, after assembling the TFT array substrate 10 and the color filter substrate 50 together and sequentially disposing the polarizer 60 and the protective layer 70 on a side of the color filter substrate 50 far away from the TFT array substrate 10, bonds the TFT array substrate 10 to the chip 30 and the flexible printed circuit 40. When the TFT array substrate 10 is bonded to the chip 30 and the flexible printed circuit 40, the anisotropic conductive adhesive film 20 is disposed on the TFT array substrate 10 first, and the chip 30 is bonded to the TFT array substrate 10 through the anisotropic conductive adhesive film 20. Then, another anisotropic conductive adhesive film 20 is disposed on the TFT array substrate 10, and the flexible printed circuit 40 is bonded to the TFT array substrate 10 through the anisotropic conductive adhesive film 20.

Specifically, the anisotropic conductive adhesive film 20 is made of translucent polymer splicing material simultaneously including three characteristics of bonding, conductivity, and insulation, and can provide narrow intervals and highly reliable cold interconnections. The feature of the anisotropic conductive adhesive film 20 is that electrical connection is along a longitudinal force direction (Z-axis direction), and high impedance obviously exists along transverse (X-axis and Y-axis directions) direction. The anisotropic conductive adhesive film 20 is mainly doped with conductive particles. An adhesive agent film thickness of about dozens of microns performs protection function and is disposed with a bottom film. The conductive particles are powders including surfaces plated with nickel and gold. Each particle has a plastic ball plated with nickel and gold. To be effective, the anisotropic conductive adhesive film 20 needs to be hot pressed, i.e., the anisotropic conductive adhesive film 20 is cured by controlling three essential factors of temperature, time, and pressure, such that the conductive particles burst to achieve an effect of electrical connection.

Figure 2:
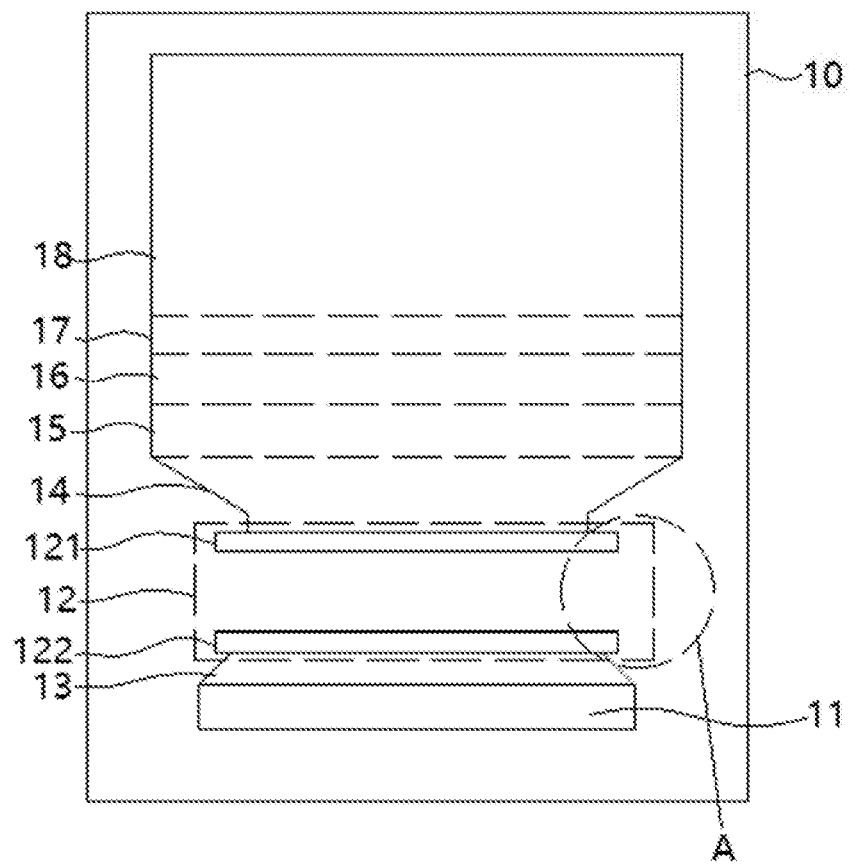
FIG. 2 is a schematic top view of a thin film transistor (TFT) array substrate of the LCD device of the present invention.

With reference to FIG. 2, FIG. 2 is a schematic top view of a thin film transistor (TFT) array substrate of the LCD device of the present invention. The TFT array substrate 10 includes a flexible printed circuit terminal region 11 and a chip terminal region 12, and the chip terminal region 12 is disposed on a side of an edge of the flexible printed circuit terminal region 11 far away from the TFT array substrate 10 and is located at an interval from the flexible printed circuit terminal region 11. The chip terminal region 12 includes an output terminal region 121 and an input terminal region 122 disposed between the output terminal region 121 and the flexible printed circuit terminal region 11.

Specifically, a region the TFT array substrate 10 is located in an out-of-array wiring region 13 between the flexible printed circuit terminal region 11 and the chip terminal region 12. The TFT array substrate 10 also includes a fan out region 14, a module test region 15, a multiplexing region 16, a dummy pixel region 17, and an active area 18 that are sequentially arranged on a side of the chip terminal region 12 far away from the flexible printed circuit terminal region 11.

Specifically, the active area 18 includes a light shielding layer, gate electrode signal transmission wires, and data signal transmission wires. Material of the light shielding layer is polycrystalline silicon, material of the gate electrode signal transmission wires is molybdenum, and material of the data signal transmission wires is titanium aluminum alloy.

Figure 3:
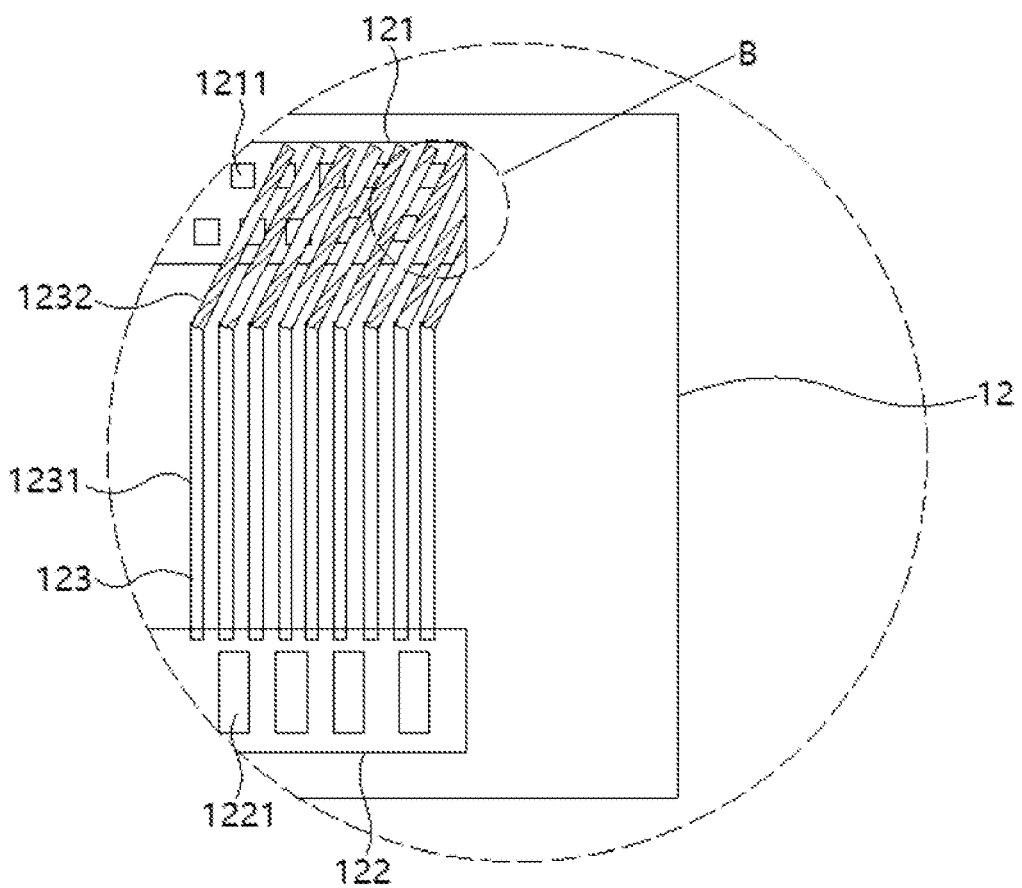
FIG. 3 is a schematic enlarged view of the area A in FIG. 2.

With reference to FIG. 3, FIG. 3 is a schematic enlarged view of the area A in FIG. 2. A plurality of output terminals 1211 are disposed in the output terminal region 121 at intervals. A plurality of input terminals 1221 are disposed in the input terminal region 122 at intervals.

Specifically, the chip 30 includes output pins corresponding to the output terminal region 121 and input pins corresponding to the input terminal region 122. The output pins are bonded to the output terminal region 121 through the anisotropic conductive adhesive film 20. The input pins are bonded to the input terminal region 122 through the anisotropic conductive adhesive film 20.

Specifically, the output pins are bonded to the output terminals 1211 through the anisotropic conductive adhesive film 20. The input pins are bonded the input terminals 1221 to through the anisotropic conductive adhesive film 20.

Specifically, a test circuit 123 is disposed between the output terminal region 121 and the input terminal region 122. The test circuit 123 includes first test signal wires 1231 and second test signal wires 1232. An end of the first test signal wires 1231 is located in the input terminal region 122. An end of the second test signal wires 1232 is located in the output terminal region 121. Another end of the second test signal wires 1232 and another end of the first test signal wires 1231 are connected to each other at a position near the output terminal region 121. Material of the first test signal wires 1231 is titanium aluminum alloy. Material of the second test signal wires 1232 is polycrystalline silicon.

Figure 4:
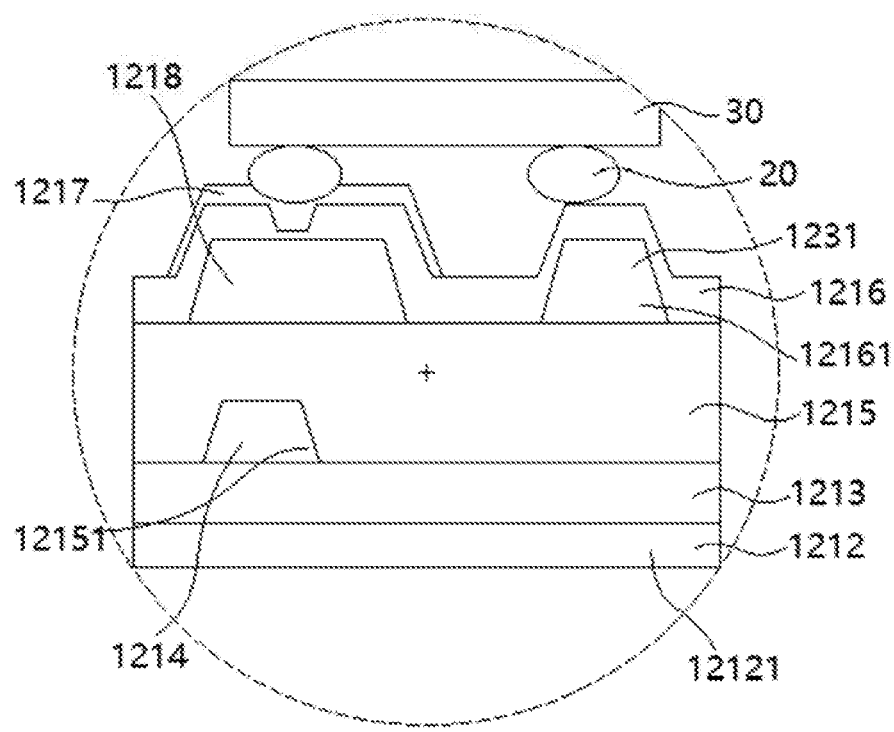
FIG. 4 is a schematic enlarged view of the area B in FIG. 3.

With reference to FIG. 4, FIG. 4 is a schematic enlarged view of the area B in FIG. 3. A position relation between a film layer structure of the output terminal region (the chip output region) 121 and the test circuit 123 is described as follows. The output terminal region 121 includes a buffer layer 1212, a gate insulation layer 1213, a gate electrode metal layer 1214, an interlayer dielectric layer 1215, a passivation layer 1216, and a pixel electrode 1217 that are sequentially stacked upon one another from bottom to top. First through holes 12151 are defined through the interlayer dielectric layer 1215. Second through holes 12121 are defined through the buffer layer 1212.

Specifically, the second test signal wires 1232 extend through the first through holes 12151 respectively, extend through the second through holes 12121 respectively, and are connected to the first test signal wires 1231 respectively.

Specifically, material of the buffer layer 1212 is silicon nitride or silicon dioxide, material of the gate insulation layer 1213 is silicon dioxide, material of the gate electrode metal layer 1214 is molybdenum, material of the interlayer dielectric layer 1215 is silicon nitride or silicon dioxide, and material of the passivation layer 1216 is silicon nitride.

Specifically, third through holes 12161 are defined through the passivation layer 1216, each of the third through holes 12161 is a trapezoidal structure with a narrow top and a wide bottom. The first test signal wires 1231 are connected to the data signal transmission wires located in the output terminal region 121 respectively through the third through holes 12161.

Each of first test signal wires 1231 of prior art each has a trapezoidal structure with a narrow top and a wide bottom, and the passivation layer 1216 of the present invention can cover the wires well to achieve an interlayer dielectric function. The input pins and the output pins of the chip 30, through the anisotropic conductive adhesive film 20, are electrically connected to the pixel electrode 1217 and the data signal transmission wires of the output terminal region 121, and are insulated from the first test signal wires 1231. In actual production, due to reasons of poor manufacturing process for the first test signal wires 1231, poor coverage and insulation of the passivation layer 1216, and low precision of a bonding process for a module COG, a film layer of the passivation layer 1216 over the first test signal wires 1231 ruptures inadvertently, titanium aluminum alloy of the first test signal wires 1231 is exposed and has a short circuit with the chip 30 through the anisotropic conductive adhesive film 20, which results in abnormality of inputted drive signals and cause display errors.

The present invention employs designs of the first test signal wires 1231 changed to the second test signal wires 1232, the first test signal wires 1231 made of titanium aluminum alloy extending from the test circuit 123 to the active area 18 are connected to the second test signal wires 1232 through the first through holes 12151 and the second through holes 12121 before arriving in the output terminal region 121, and polycrystalline silicon is used for the test signal wires, which avoids display errors due to poor precision of the COG and further enhances reliability of the module process.

Advantages of the present invention lies in that the LCD device provided by the present invention changes the test signal wires of titanium aluminum material of the test circuit extending toward the displaying region into test signal wires of polycrystalline silicon material before reaching the chip output region by replacement of wires, which avoids display errors due to poor precision of the COG and further enhances reliability of the module process.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A liquid crystal display (LCD) device, comprising: a thin film transistor (TFT) array substrate, an anisotropic conductive adhesive film disposed on the TFT array substrate, and a chip, a flexible printed circuit, a color filter substrate, a polarizer, and a protective layer bonded to the TFT array substrate through the anisotropic conductive adhesive film; the TFT array substrate located in an out-of-array wiring region between a flexible printed circuit terminal region and a chip terminal region, the TFT array substrate further comprising a fan out region, a module test region, a multiplexing region, a dummy pixel region, and an active area sequentially arranged and disposed on a side of the chip terminal region far away from the flexible printed circuit terminal region; the TFT array substrate comprising the flexible printed circuit terminal region and the chip terminal region, the chip terminal region disposed near a side of the flexible printed circuit terminal region far away from an edge of the TFT array substrate and located at an interval from the flexible printed circuit terminal region; the chip terminal region comprising an output terminal region and an input terminal region disposed between the output terminal region and the flexible printed circuit terminal region;

wherein a test circuit is disposed between the output terminal region and the input terminal region, the test circuit comprises first test signal wires and second test signal wires, an end of the first test signal wires is located in the input terminal region, an end of the second test signal wires is located in the output terminal region, another end of the second test signal wires and another end of the first test signal wires are connected to each other at a position near the output terminal region; material of the first test signal wires is titanium aluminum alloy, and material of the second test signal wires is polycrystalline silicon.

2. The LCD device as claimed in claim 1, wherein the active area comprises a light shielding layer, gate electrode signal transmission wires and data signal transmission wires; material of the light shielding layer is polycrystalline silicon, material of the gate electrode signal transmission wires is molybdenum, and material of the data signal transmission wires is titanium aluminum alloy.

3. The LCD device as claimed in claim 1, wherein the output terminal region comprises a buffer layer, a gate insulation layer, a gate electrode metal layer, an interlayer dielectric layer, a passivation layer, and a pixel electrode that are sequentially stacked upon one another from bottom to top; the interlayer dielectric layer is defined with first through holes, and the buffer layer is defined with second through holes.

4. The LCD device as claimed in claim 3, wherein the second test signal wires extend through the first through holes respectively, extend through the second through holes respectively, and are connected to the first test signal wires respectively.

5. The LCD device as claimed in claim 3, wherein material of the buffer layer is silicon nitride or silicon dioxide, material of the gate insulation layer is silicon dioxide, material of the gate electrode metal layer is molybdenum, material of the interlayer dielectric layer is silicon nitride or silicon dioxide, and material of the passivation layer is silicon nitride.

6. The LCD device as claimed in claim 3, wherein the passivation layer is defined with third through holes, each of the third through holes is a trapezoidal structure with a narrow top and a wide bottom.

7. The LCD device as claimed in claim 6, wherein the first test signal wires are connected to the data signal transmission wires located in the output terminal region through the third through holes.

8. The LCD device as claimed in claim 1, wherein the chip comprises output pins corresponding to the output terminal region and input pins corresponding to the input terminal region; the output pins are bonded to the output terminal region through the anisotropic conductive adhesive film, and the input pins are bonded to the input terminal region through the anisotropic conductive adhesive film.

9. The LCD device as claimed in claim 8, wherein a plurality of output terminals are disposed in the output terminal region at intervals, a plurality of input terminals are disposed in the input terminal region at intervals; the output pins are bonded to the output terminals through the anisotropic conductive adhesive film respectively, the input pins are bonded to the input terminals through the anisotropic conductive adhesive film respectively.

10. A liquid crystal display (LCD) device, comprising: a thin film transistor (TFT) array substrate, an anisotropic conductive adhesive film disposed on the TFT array substrate, and a chip, a flexible printed circuit, a color filter substrate, a polarizer, and a protective layer bonded to the TFT array substrate through the anisotropic conductive adhesive film;
the TFT array substrate comprising a flexible printed circuit terminal region and a chip terminal region, the chip terminal region disposed near a side of the flexible printed circuit terminal region far away from an edge of the TFT array substrate and located at an interval from the flexible printed circuit terminal region; the chip terminal region comprising an output terminal region and an input terminal region disposed between the output terminal region and the flexible printed circuit terminal region;
wherein a test circuit is disposed between the output terminal region and the input terminal region, the test circuit comprises first test signal wires and second test signal wires, an end of the first test signal wires is located in the input terminal region, an end of the second test signal wires is located in the output terminal region, another end of the second test signal wires and another end of the first test signal wires are connected to each other at a position near the output terminal region; material of the first test signal wires is titanium aluminum alloy, and material of the second test signal wires is polycrystalline silicon.

11. The LCD device as claimed in claim 10, wherein the output terminal region comprises a buffer layer, a gate insulation layer, a gate electrode metal layer, an interlayer dielectric layer, a passivation layer, and a pixel electrode that are sequentially stacked upon one another from bottom to top; the interlayer dielectric layer is defined with first through holes, and the buffer layer is defined with second through holes.

12. The LCD device as claimed in claim 11, wherein the second test signal wires extend through the first through holes respectively, extend through the second through holes respectively, and are connected to the first test signal wires respectively.

13. The LCD device as claimed in claim 11, wherein material of the buffer layer is silicon nitride or silicon dioxide, material of the gate insulation layer is silicon dioxide, material of the gate electrode metal layer is molybdenum, material of the interlayer dielectric layer is silicon nitride or silicon dioxide, and material of the passivation layer is silicon nitride.

14. The LCD device as claimed in claim 11, wherein the passivation layer is defined with third through holes, each of the third through holes is a trapezoidal structure with a narrow top and a wide bottom.

15. The LCD device as claimed in claim 14, wherein the first test signal wires are connected to data signal transmission wires located in the output terminal region through the third through holes.

16. The LCD device as claimed in claim 10, wherein the chip comprises output pins corresponding to the output terminal region and input pins corresponding to the input terminal region; the output pins are bonded to the output terminal region through the anisotropic conductive adhesive film, and the input pins are bonded to the input terminal region through the anisotropic conductive adhesive film.

17. The LCD device as claimed in claim 16, wherein a plurality of output terminals are disposed in the output terminal region at intervals, a plurality of input terminals are disposed in the input terminal region at intervals; the output pins are bonded to the output terminals through the anisotropic conductive adhesive film respectively, the input pins are bonded to the input terminals through the anisotropic conductive adhesive film respectively.

* * * * *